(12) United States Patent
Miyazaki

(10) Patent No.: US 7,114,644 B2
(45) Date of Patent: Oct. 3, 2006

(54) JOINING METHOD BY AU-SN BRAZING MATERIAL

(75) Inventor: Kenichi Miyazaki, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 11/055,945

(22) Filed: Feb. 11, 2005

(65) Prior Publication Data
US 2005/0184135 A1    Aug. 25, 2005

(30) Foreign Application Priority Data
Feb. 20, 2004    (JP)    ............................. 2004-044600

(51) Int. Cl.
*B23K 31/02* (2006.01)
*B23K 5/22* (2006.01)
(52) U.S. Cl. ....................... 228/208; 228/203; 228/219; 228/262.1
(58) Field of Classification Search ...................... None
See application file for complete search history.

(56) References Cited

U.S. PATENT DOCUMENTS

| | | | |
|---|---|---|---|
| 5,234,153 A * | 8/1993 | Bacon et al. ............. | 228/122.1 |
| 5,794,839 A | 8/1998 | Kimura et al. ........... | 228/123.1 |
| H1934 H | 1/2001 | Dautartas ................... | 420/507 |
| 6,691,911 B1 * | 2/2004 | Iwai et al. ................ | 228/124.6 |
| 2002/0171157 A1 * | 11/2002 | Soga et al. ................. | 257/783 |
| 2002/0190106 A1 | 12/2002 | Iwai et al. ................ | 228/124.6 |
| 2003/0174397 A1 * | 9/2003 | Sugawara et al. .......... | 359/484 |
| 2004/0007384 A1 * | 1/2004 | Soga et al. ................ | 174/260 |
| 2004/0042181 A1 * | 3/2004 | Nagasaki ................... | 361/725 |
| 2005/0063161 A1 * | 3/2005 | Yanase et al. ............. | 361/707 |

FOREIGN PATENT DOCUMENTS

| | | |
|---|---|---|
| JP | 06-126485 A | 5/1994 |
| JP | 2001-176999 | 6/2001 |

* cited by examiner

*Primary Examiner*—Lynne R. Edmondson
(74) *Attorney, Agent, or Firm*—Roberts & Roberts, LLP

(57) ABSTRACT

The present invention provides a method of joining members to be joined by use of an Au—Sn brazing material, in which joining is performed by adjusting the composition and thickness of the Au—Sn brazing material so that the Sn content of the joint after joining is from 20.65 to 23.5 wt %. The invention has been completed on the basis of the discovery that the true eutectic point of this alloy system corresponds to 20.65 wt % Sn. In the invention, as means for adjusting the composition of a resulting joint, it is necessary to appropriately adjust the composition and thickness of a brazing material according to the thickness of a gold plating. In the invention, the relationship between the brazing material thickness and the gold plating thickness is shown when the brazing material to be used has an Sn content of 21 wt % to 25 wt %.

2 Claims, 9 Drawing Sheets

(a)

Au-20.65%Sn
Au-20%Sn
Au-19%Sn
Au-18%Sn (b)

(a)

(b)

⟍⟍ Au-20.65%Sn
▓ Au-20%Sn
▨ Au-19%Sn
☐ Au-18%Sn

JOINING METHOD BY AU-SN BRAZING MATERIAL

BACKGROUND OF THE INVENTION

1. Field of the Invention

The present invention relates to a method of joining by use of an Au—Sn brazing material, for example, in joining a lead pin to a circuit terminal or sealing a semiconductor package.

2. Description of the Related Art

Au—Sn brazing materials are brazing materials in which eutectic structures of Au—Sn alloys are used, and have relatively low melting points (about 280° C.). In addition, Au—Sn brazing materials are excellent in corrosion resistance and have the advantage that they do not contain harmful substances such as Pb unlike solders (Sn-37 wt % Pb) that have thitherto been used. Au—Sn brazing materials are widely used in the field of electrical and electronic equipment and have been field proven, for example, as sealing materials for the hermetic sealing of electronic part packages and joining materials for joining lead pins to circuit terminals.

Although basically a joint formed by an Au—Sn brazing material has an Au—Sn eutectic structure, an Au—Sn alloy phase having a high Au content (hereinafter referred to as an Au rich phase) may sometimes occur partially. This Au rich phase, which is a kind of intermetallic compound, is hard and has a higher melting point than the surrounding Au—Sn eutectic phase. Therefore, this Au rich phase does not dissolve at the melting points of brazing materials and remains as a solid phase. And because the Au rich phase is diverse in size, variations may sometimes be produced in the thickness of a joint. In particular, in a joining method using Au—Sn brazing materials, joining is often performed by plating parts to be joined with gold in order to improve wettability. Owing to the diffusion of gold from this gold plating, the gold content in a joint rises and an Au rich phase becomes apt to occur. Also, in the composition range in which this Au rich phase occurs, the crystal structure becomes coarsened and the solder flow becomes worse, thus posing a problem.

The present applicant has so far disclosed a sealing method and a joining method that are effective in the above-described uses (Japanese Patent No. 3086086, Japanese Patent Laid-Open No. 2001-176999). In these methods, compared to Au—Sn brazing materials of Au-20 wt % Sn that have hitherto been used, there are used brazing materials having a composition slightly displaced from a eutectic point, in which the gold content is lowered and the Sn content is raised to 20.5 through 21.5%. In these methods, by using a brazing material of low gold content, the composition of the brazing material is prevented from deviating from a eutectic point to the gold side even when the gold content in the brazing material rises during joining due to the diffusion of gold from outside and the occurrence of a gold rich phase is suppressed. A joint formed by these methods has a complete eutectic structure or a eutectic structure containing a small amount of Sn rich phase. Compared to an Au rich phase, an Sn rich phase has a low melting point, exerts a small effect and suppresses the coarsening of a structure by suppressing the occurrence of an Au rich phase. Therefore, by causing a joint having such a structure like an Sn rich phase to be formed, it becomes possible to perform joining in a stable manner.

The methods disclosed by the present applicant can efficiently form good joints although the methods are simple ones that involve slightly changing the composition of a brazing material to be used. However, according to examinations by the present inventor, although in most cases good joints are obtained by using this brazing material the composition of which is adjusted, in some cases an Au rich phase occurs and satisfactory joints may not be formed. Although the fraction defective itself on that occasion is not high, from the standpoint of ensuring product yield and effective utilization of resources, it is desirable to cause the fraction defective to approach zero as far as possible if this is possible.

The present invention has been made against the above-described background and has as its object the provision of a joining method using an Au—Sn brazing material that completely suppresses the occurrence of an Au rich phase and can form a homogeneous joint with higher probability.

SUMMARY OF THE INVENTION

The present inventor investigated the reason why joining defects occur with a brazing material in which the Sn content is slightly higher than that of an eutectic composition, and drew the following two conclusions. First, the first conclusion is that a composition (Au-20 wt % Sn) that has hitherto been regarded as a eutectic composition does not show a complete eutectic structure free from an Au rich phase and that a composition a little displaced from this shows a true eutectic structure. This view was obtained from the results of repeated demonstration tests by the present inventor, which will be described later, and Au—Sn alloys show a complete eutectic structure at 20.65 wt % regardless of the cooling rate and the size of cast alloys. It follows that, therefore, even if a brazing material composition is prepared by considering a composition that has hitherto been considered to have a eutectic point, a joint may sometimes deviate from the eutectic point, with the result that an Au rich phase may occur.

And the second conclusion is that due to the diffusion of gold from the gold plating on the members to be joined, the composition of the joint is such that the gold content becomes higher than the brazing material composition before the joining and the amount of the change in this gold content varies depending on the thickness of the gold plating. That is, the amount of diffused gold increases in proportion to the thickness of the gold plating and the gold content of the joint exceeds an intended gold content, causing a gold rich phase to occur readily. In other words, it might be thought that the reason why joint defects may sometimes occur in conventional methods is that the thickness of the gold plating during joining is too large.

Supposing that on the basis of the above-described considerations, as a joining method that completely suppresses the occurrence of an Au rich phase, it is preferable to ensure that the composition of a joint is kept in a given range from a true eutectic point to a region displaced slightly from the eutectic point to the Sn side, the present inventor has hit upon the present invention.

That is, the invention provides a method of joining members to be joined by use of an Au—Sn brazing material, in which joining is performed by adjusting the composition and thickness of the Au—Sn brazing material so that the Sn content of a joint after joining is from 20.65 to 23.5 wt %.

In the invention, the reason why the composition of the joint is kept in this range is that the true eutectic point of this alloy system is 20.65 wt % Sn, as is apparent from the results of the investigations by the present inventor. The specified upper limit of the Sn content is 23.5 wt %. This is because if the Sn content exceeds 23.5 wt %, the liquidus line temperature of a brazing material becomes a high temperature of not less than 320° C., causing joining defects. As means of adjusting the composition of this joint, the composition of the brazing material is kept in the above-described range when joining is performed without the plating of the members to be joined with gold. On the other hand, when joining is performed after plating the members to be joined with gold, which is usually carried out, it is necessary to appropriately vary the composition and thickness of the brazing material according to the thickness of the gold plating as means of adjusting the composition of this joint, because the composition of the joint varies with the thickness of the gold plating due to the diffusion of gold from the gold plating.

Therefore, the present inventor examined the relationship between plating thickness and brazing material thickness for each composition of the brazing material to be used in a case where the members to be joined are plated with gold, and studied the conditions under which the composition of a joint after joining falls in the above-described range.

When brazing materials to be used have an Sn content of 21 wt % to 23 wt %, it is preferable to adjust the thickness of the gold plating in the ranges that satisfy the following equations. The relationship between the thickness of the brazing material and the thickness of the thickness of the gold plating in this case is as shown in FIGS. 1 to 3.

| At 21 wt % of Sn | $y \leqq 0.0126 \, x$ |
|---|---|
| At 22 wt % of Sn | $y \leqq 0.0480 \, x$ |
| At 23 wt % of Sn | $y \leqq 0.0825 \, x$ |

(x: thickness of brazing material, y: thickness of gold plating)

In a case where brazing materials to be used have an Sn content exceeding 24 wt %, it is preferable to adjust the thickness of the gold plating to the region that is defined by two numerical expressions as given below. The reason why the definition by two numerical expressions is necessary like this is that because the Sn content becomes high in these brazing materials, an Sn rich phase occurs in a large amount even when the thickness of the gold plating is increased, thereby requiring an equation in which the effect of an Sn rich phase is considered. The relationship between the thickness of the brazing material and the thickness of the thickness of the gold plating in this case is as shown in FIGS. 4 and 5.

| At 24 wt % of Sn | $0.0152 \, x \leqq y \leqq 0.1163 \, x$ |
|---|---|
| At 25 wt % of Sn | $0.0452 \, x \leqq y \leqq 0.1492 \, x$ |

(x: thickness of brazing material, y: thickness of gold plating)

The reason why the specified composition range of brazing materials to be used is 21 to 25 wt % Sn is that it is impossible to suppress the occurrence of a gold rich phase if brazing materials of less than 21 wt % Sn are used. If brazing materials of more than 25 wt % Sn are used, there is a possibility that an Sn rich phase may occur in a large amount and besides brazing materials having a high Sn content have poor workability, with the result it is impossible to manufacture brazing materials having precision shapes.

The thickness of the gold plating differs depending on the kind of members to be joined, and it also differs according to the wettability and the like required even in the case of the same kind of members to be joined. In fixing lead pins or sealing semiconductor packages, gold plating of 0.05 to 3.0 μm is applied. In the sealing of semiconductor packages, the gold plating thickness ranges from small to relatively large sizes. In the invention, therefore, joining is performed in such a manner that the thickness of the gold plating on members to be joined is first determined and after that, the composition and thickness of the brazing material to be used are appropriately selected. Incidentally, for example, in the case of joining of a lead pin, the thickness of the gold plating in the invention is a total of the plating layers separately applied to both of the lead pin and the circuit substrate because joining is performed after both the lead pin and the circuit substrate are plated with gold.

On the other hand, the composition of a brazing material can be adjusted by controlling the composition of a melt during melting and casting. Also, it is possible to appropriately vary the thickness of a brazing material in the manufacturing process.

In the joining method of the invention, the conditions and the process may be generally conventional. That is, joining is generally performed in a temperature range of 300 to 320° C. under an inert atmosphere of nitrogen or hydrogen gas or vacuum.

As described above, according to the invention, in the joining process using an Au—Sn brazing material, joining can be completed without causing a gold rich phase to occur in a joint. As a result of this, it is possible to suppress joining defects ascribable to the nonuniformity of the thickness of the joint. According to the invention, it is possible to lower a fraction defective of about 2% in conventional methods to one tenth and hence it is possible to improve product yield and ensure manufacturing efficiency.

Also, in the invention, there are multiple factors capable of being varied, such as whether plating with gold is performed, the thickness of the gold plating, and the composition and thickness of the brazing material and, therefore, when a brazing material of precision shape is used and when the workability of a brazing material is required, it is possible to use a brazing material of low Sn content. Thus it is possible to carry out a joining method of the invention in a flexible manner.

BRIEF DESCRIPTION OF THE DRAWINGS

FIG. 6(*b*) is a schematic representation of a sectional structure of an ingot made of an Au-20.65 wt % Sn alloy;

DETAILED DESCRIPTION OF THE PREFERRED EMBODIMENTS

Preferred embodiments of the invention will be described below. First, a description will be given of two examples of demonstration tests conducted in order to find a eutectic point of Au—Sn alloys and, at the same time, a description will be given of results of an observation of the structures of joints that were obtained by actually performing package sealing by use of Au—Sn brazing materials of each composition.

Demonstration tests of eutectic point: A true eutectic point of multiple Au—Sn alloys was investigated by melting and casting these Au—Sn alloys and examining the composition distribution and structures of ingots. In the tests, disk-like ingots 30 mm in diameter and 30 mm in height were produced and the composition distribution and structures of the sections of the ingots were investigated.

Figure 1:
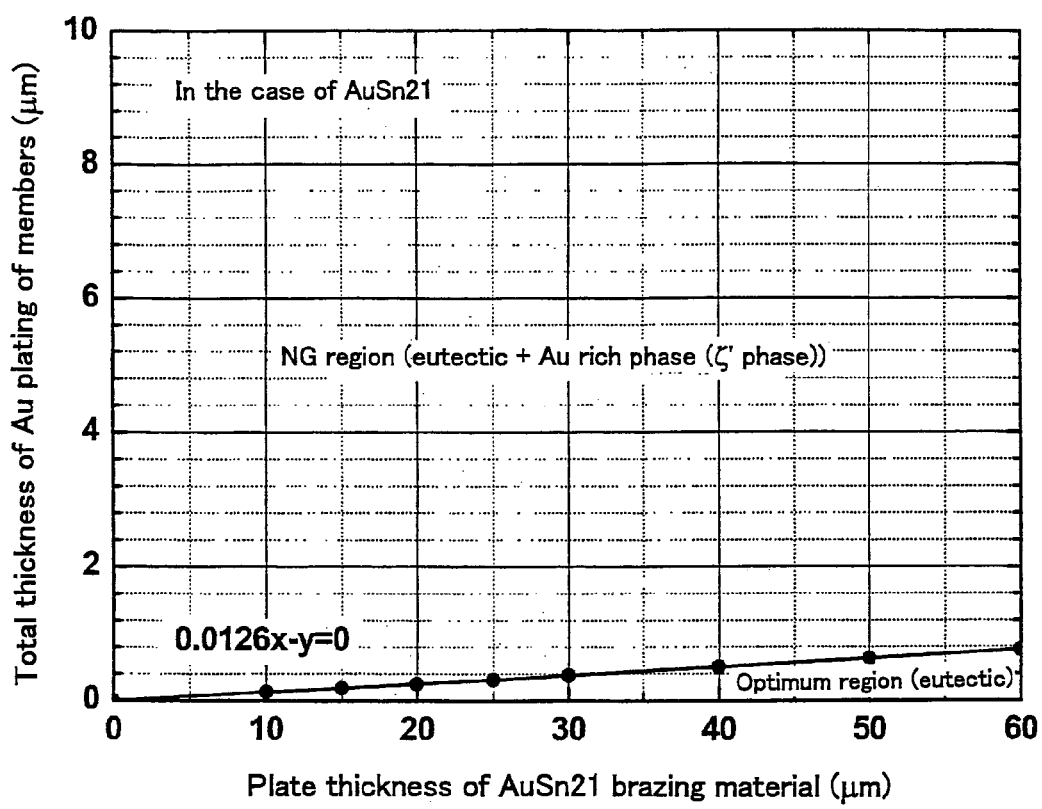
FIG. 1 is a graph that shows an appropriate region of brazing material thickness and gold plating thickness in a case where an Au—Sn brazing material having an Sn content of 21 wt % is used.
Figure 2:
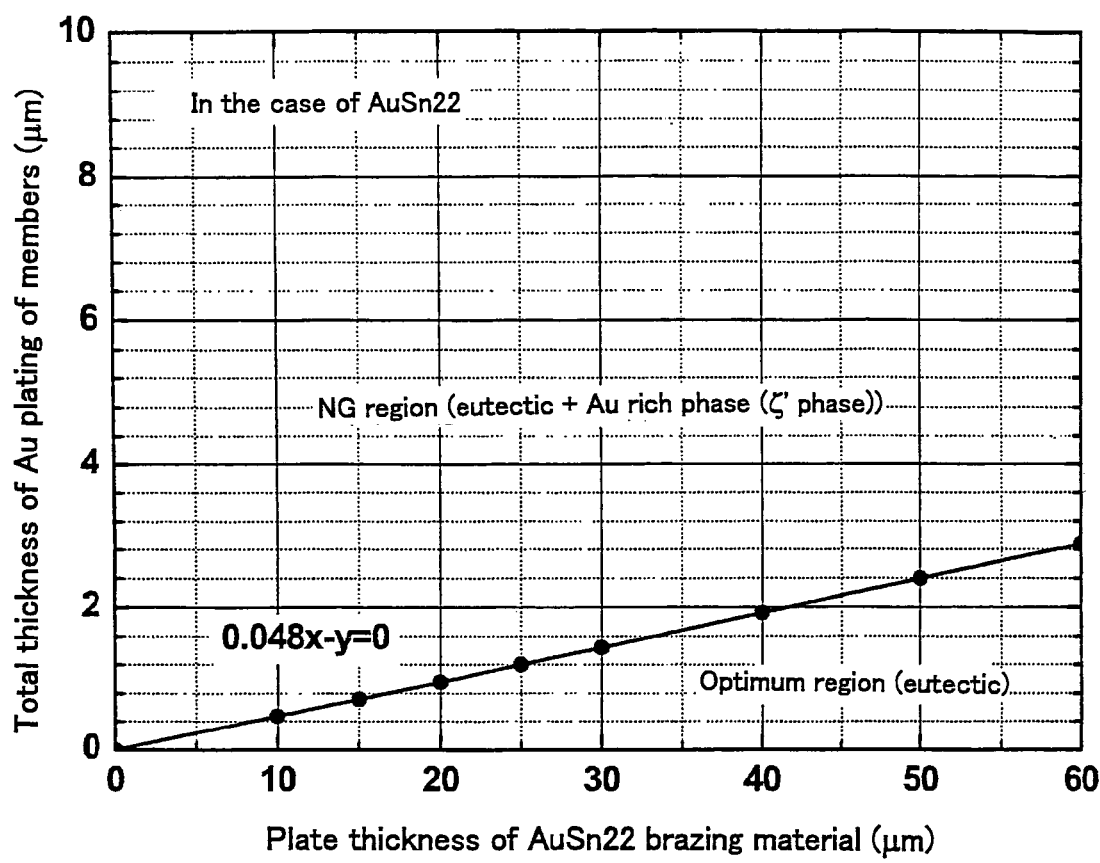
FIG. 2 is a graph that shows an appropriate region of brazing material thickness and gold plating thickness in a case where an Au—Sn brazing material having an Sn content of 22 wt % is used.
Figure 3:
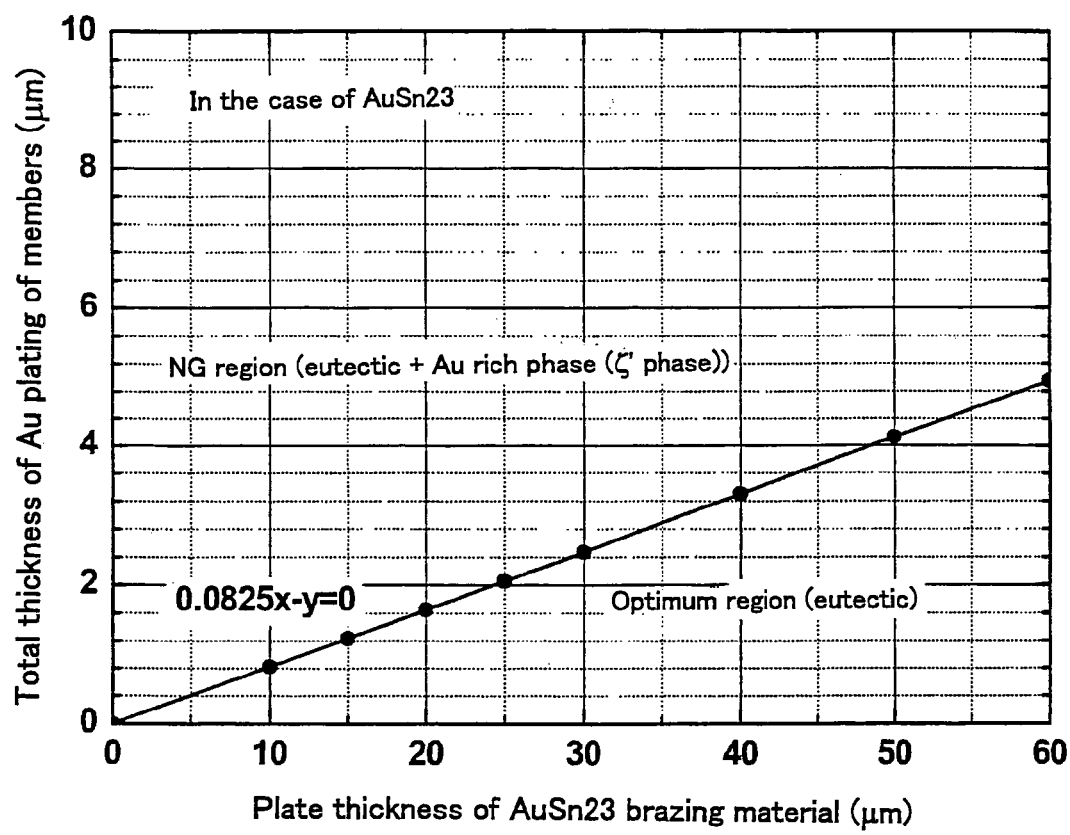
FIG. 3 is a graph that shows an appropriate region of brazing material thickness and gold plating thickness in a case where an Au—Sn brazing material having an Sn content of 23 wt % is used.
Figure 4:
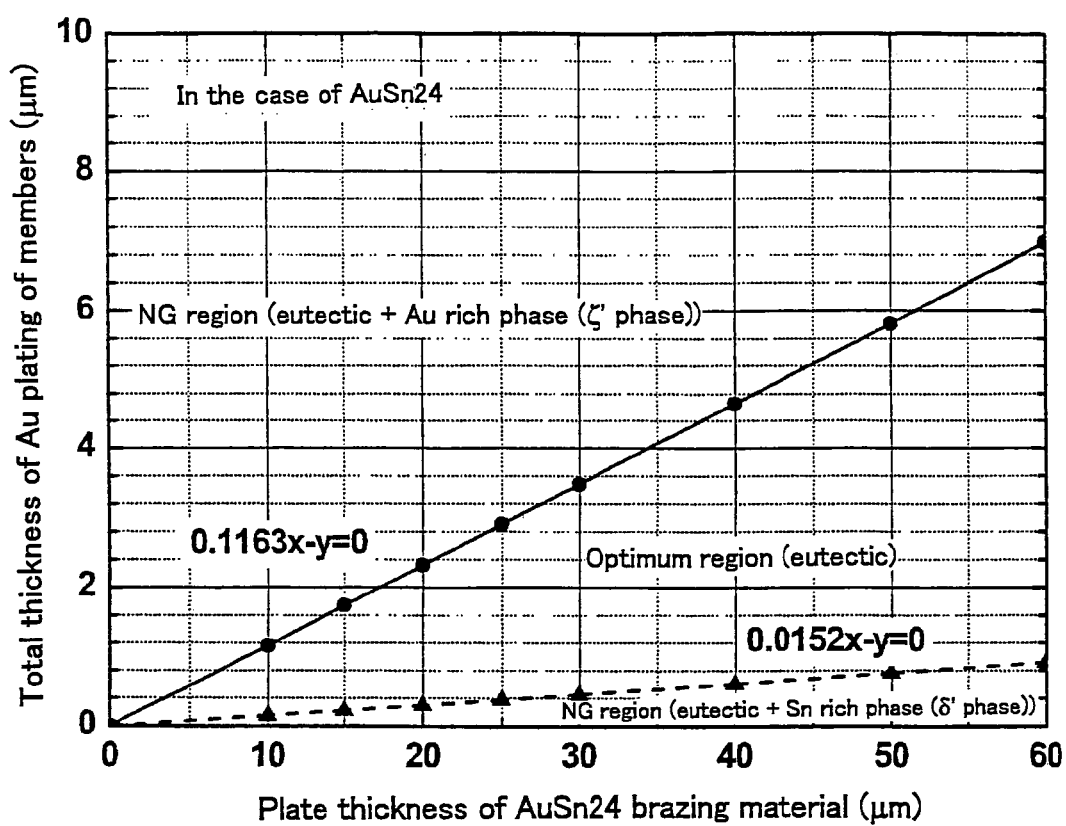
FIG. 4 is a graph that shows an appropriate region of brazing material thickness and gold plating thickness in a case where an Au—Sn brazing material having an Sn content of 24 wt % is used.
Figure 5:
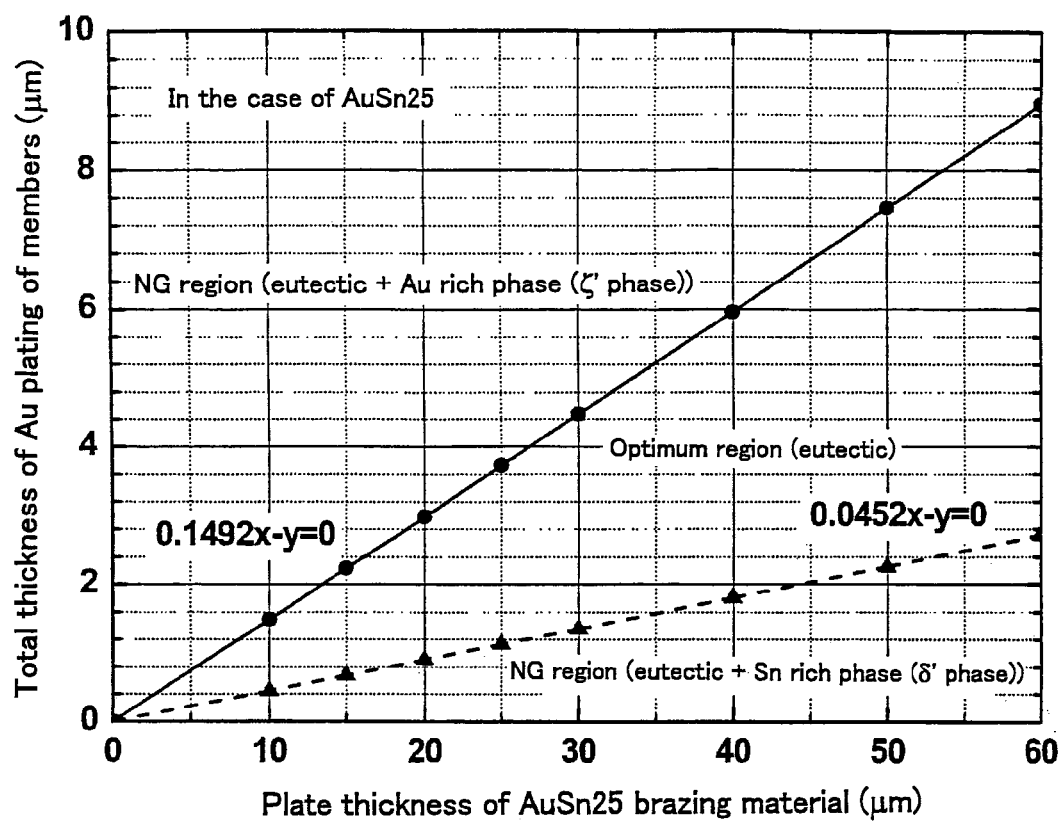
FIG. 5 is a graph that shows an appropriate region of brazing material thickness and gold plating thickness in a case where an Au—Sn brazing material having an Sn content of 25 wt % is used.
Figure 6:
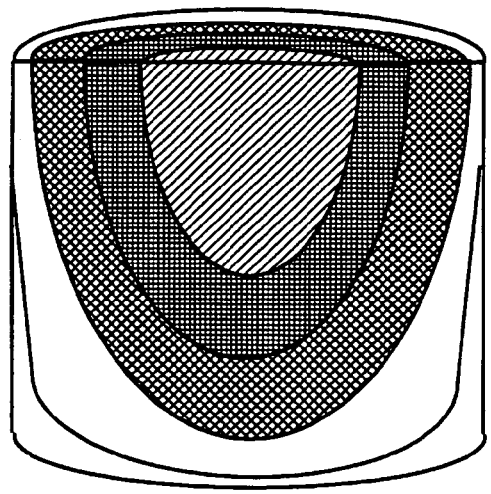
FIG. 6(*a*) is a schematic representation of a sectional structure of an ingot made of an Au-20 wt % Sn alloy.
Figure 6:
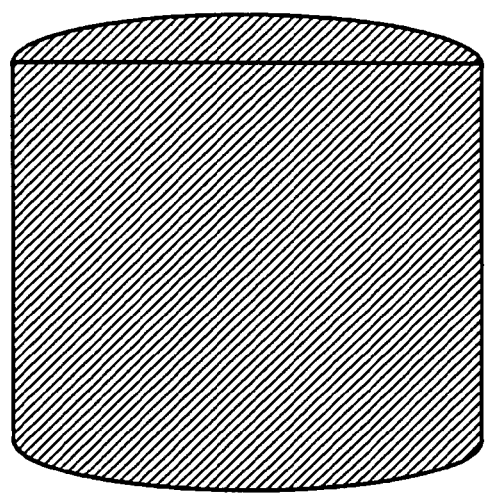

FIG. 6(a) schematically shows a sectional structure of an ingot made obtained by casting an Au-20 wt % Sn alloy, which has hitherto been considered to have a eutectic composition. In the ingot of this composition, as shown in the figure, the composition has no uniformity and alloy layers having different structures were formed. And in the core of the ingot, a layer made of an Au-20.65 wt % Sn alloy was formed. Therefore, when an Au-20.65 wt % Sn alloy was cast, an alloy ingot having a uniform composition could be obtained as shown in FIG. 6(b).

Joining test: Next, semiconductor packages were sealed by use of Au—Sn brazing materials having various compositions and thicknesses and the structures of joints were observed. The brazing materials used in this test were obtained by rolling Au—Sn alloy ingots of prescribed compositions, which are produced by the melting and casting process, to a prescribed thicknesses in sheet form and blanking the sheets into brazing materials in angular ring form. In the packages to be jointed, both the base and the cap are made of Kovar and only the cap was plated with gold before joining. And in joining (sealing) the base and the cap, the brazing material after working was interposed between the base and the cap plated with gold, and joining was performed by heating them to 310° C. by use of a conveyor furnace.

Figure 7:
FIG. 7 is a photograph of a sectional structure (eutectic structure) of a joint after a joining test.
Figure 8:
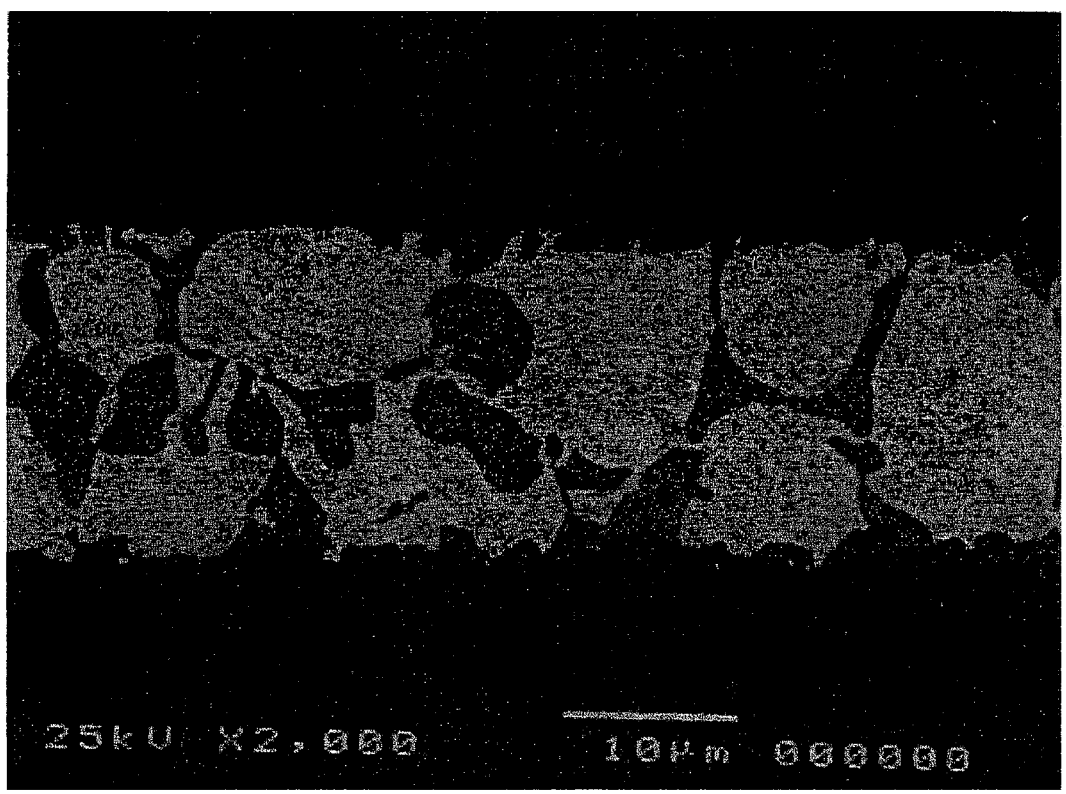
FIG. 8 is a photograph of a sectional structure (eutectic structure+Au rich phase) of a joint after a joining test.
Figure 9:
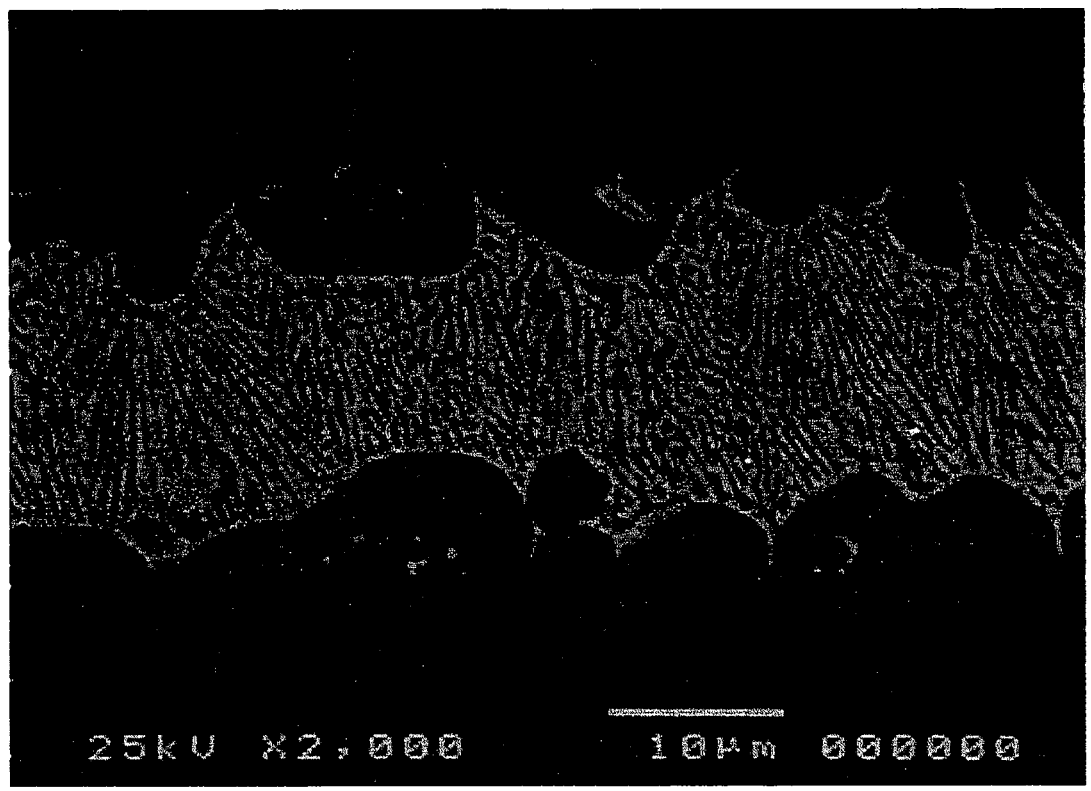
FIG. 9 is a photograph of a sectional structure (eutectic structure+Sn rich phase) of a joint after a joining test.

Table 1 shows results of an observation of the structures of joints that depend on the composition and thickness of the Au—Sn brazing materials and the thickness of the gold plating on the cap, which were examined in this embodiment. FIGS. 7 to 9 each show a photograph of a sectional structure of a joint observed in this test, respectively, an almost complete eutectic structure (the structure indicated in FIG. 7 and by ○ in Table 1), a structure in which an Au rich phase is mixed into a eutectic structure (the structure indicated in FIG. 8 and by x in Table 1), and a structure in which an Sn rich phase is mixed into a eutectic structure (the structure indicated in FIG. 9 and by □ in Table 1).

TABLE 1

| Sn content of brazing material | Brazing material thickness | Gold plating thickness | Structure of joint |
|---|---|---|---|
| 21 wt % | 10 μm | 0.05 μm | ○ |
| | | 0.5 μm | X |
| | 20 μm | 0.05 μm | ○ |
| | | 0.5 μm | X |
| | 30 μm | 0.2 μm | ○ |
| | | 0.8 μm | X |
| 22 wt % | 10 μm | 0.3 μm | ○ |
| | | 0.8 μm | X |
| | 20 μm | 0.8 μm | ○ |
| | | 1.2 μm | X |
| | 30 μm | 1.2 μm | ○ |
| | | 1.8 μm | X |
| 23 wt % | 10 μm | 0.6 μm | ○ |
| | | 1.2 μm | X |
| | 20 μm | 1.2 μm | ○ |
| | | 2.0 μm | X |

TABLE 1-continued

| Sn content of brazing material | Brazing material thickness | Gold plating thickness | Structure of joint |
|---|---|---|---|
| | 30 μm | 2.1 μm | ○ |
| | | 3.0 μm | X |
| 24 wt % | 10 μm | 0.5 μm | Δ |
| | | 1.0 μm | ○ |
| | | 2.0 μm | X |
| | 20 μm | 0.2 μm | Δ |
| | | 1.2 μm | ○ |
| | | 3.0 μm | X |
| | 30 μm | 0.2 μm | Δ |
| | | 2.0 μm | ○ |
| | | 4.0 μm | X |
| 25 wt % | 10 μm | 0.1 μm | Δ |
| | | 0.8 μm | ○ |
| | | 2.0 μm | X |
| | 20 μm | 0.4 μm | Δ |
| | | 2.0 μm | ○ |
| | | 3.5 μm | X |
| | 30 μm | 0.8 μm | Δ |
| | | 3.0 μm | ○ |
| | | 5.0 μm | X |

○ Eutectic structure
X Eutectic structure + Au rich phase
Δ Eutectic structure + Excessive Sn rich phase Although some of the compositions etc. of the brazing materials examined in this embodiment are within the optimum ranges described in the present application and some are outside the ranges, it became apparent from the results of the examination that by ensuring brazing material thicknesses and gold plating thicknesses that fall in optimum ranges for the brazing materials of each composition, it is possible to obtain joints having a good eutectic structure in which an Au rich phase does not occur.

What is claimed is:

1. A method of joining members to be joined by use of an Au—Sn brazing material, said method comprising the steps of:

applying a gold plating of 0.05 μm to 3 μm in thickness onto joint surfaces of the members to be joined, prior to a joining of the members; and performing a joining of the members, at a temperature ranging from 300° C. to 320° C., under an inert atmosphere of nitrogen, hydrogen or vacuum, with an Au—Sn brazing material consisting of an Sn content of 23 wt % to 25 wt % and the balance being Au;

adjusting a thickness of the Au—Sn brazing material so that the following relationships hold among a composition and the thickness of the Au—Sn brazing material and the thickness of a gold plating; and adjusting the Sn content of a joint after joining to be 20.65 wt % to 23.5 wt %; thereby providing joints having either a eutectic structure or a structure containing an Sn rich phase in a eutectic structures:

| At 22 wt % of Sn | $y \leq 0.0480\, x$ |
|---|---|
| At 23 wt % of Sn | $y \leq 0.0825\, x$ |
| At 24 wt % of Sn | $0.0152\, x \leq y \leq 0.1163\, x$ |
| At 25 wt % of Sn | $0.0452\, x \leq y \leq 0.1492\, x$ | where x is the thickness of the brazing material in μm, and y is the thickness of the gold plating in μm, and where $0.05 \leq y \leq 3$.

2. The method of claim 1 wherein composition and thickness of the Au—Sn brazing material are adjusted so that the Sn content of a joint formed by the joining is from 21 wt % to 23 wt %.

* * * * *